Aug. 26, 1924.                                                          1,506,565
W. E. CLATWORTHY
VELOCIPEDE
Filed Dec. 27, 1920

Inventor
W. E. CLATWORTHY.
By Fisher & ......
Attorneys

Patented Aug. 26, 1924.

1,506,565

UNITED STATES PATENT OFFICE.

WILLIAM E. CLATWORTHY, OF CLEVELAND, OHIO.

VELOCIPEDE.

Application filed December 27, 1920. Serial No. 433,170.

*To all whom it may concern:*

Be it known that I, WILLIAM E. CLATWORTHY, a citizen of the United States, residing at Cleveland, in the county of Cuyahoga and State of Ohio, have invented certain new and useful Improvements in a Velocipede, of which the following is a specification.

My invention pertains to velocipedes, and my primary object is to provide a velocipede and truck combined which may be used by children either for pleasure or for practical purposes in transporting goods. As disclosed herein the vehicle is a convertible one, that is, it is particularly constructed to be shortened or lengthened to produce a pleasure velocipede having a short wheel base or a velocipede truck having a long wheel base capable of carrying a wagon body, and in designing this vehicle, my aim has been to simplify the construction with a view to durability and low cost and to organize and connect the parts so that any child may readily disassemble and assemble the same and find interest and pleasure in converting the vehicle from one state or condition into another.

Figure 1:
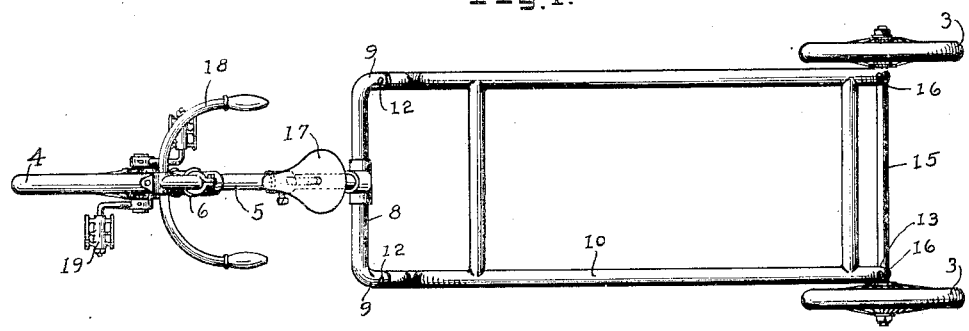
Figure 2:
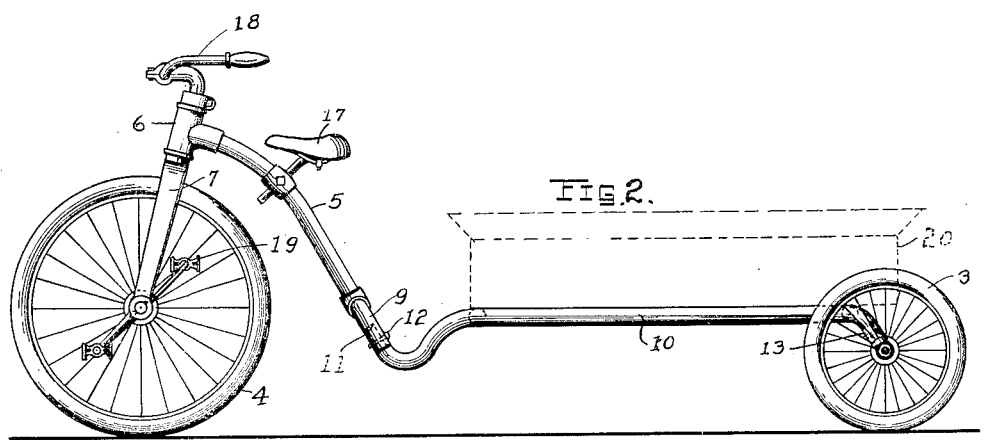
Figure 3:
Figure 4:
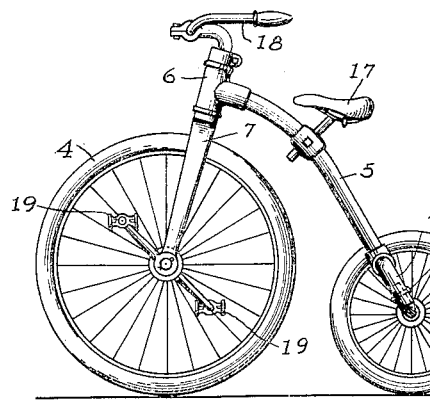
Figure 5:
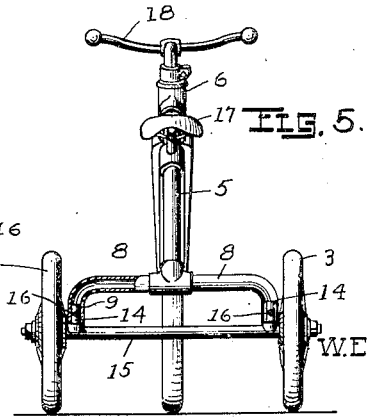

In the drawing accompanying this application, Fig. 1 is a top plan view of my convertible velocipede truck, without a wagon body, the body being omitted to more clearly disclose the extension frame. Fig. 2 is a side view of the vehicle, a wagon body being shown in dotted lines upon the extension frame. Fig. 3 is a side view of the extension frame by itself. Figs. 4 and 5 are side and rear views, respectively, of the velocipede in its contracted form.

The vehicle comprises two small rear wheels 3—3 and a large front steering wheel 4, united and connected by a sectional frame consisting of a tubular bow section 5 having a head 6 within which the steering post of the fork 7 for the front wheel is adapted to be supported for turning movement according to common practices, and the lower rear end of bow portion 5 includes a fork or lateral extending arms 8 with tubular extremities 9 bent to project downwardly at an angle of approximately the same inclination as the bottom end of bow section 5. A skeleton frame 10, preferably made of tubular material, provides an extensible section for bow section 5, and tubular side members of section 10 are bent downwardly and upwardly on compound curved lines at their front ends and provided with reduced extensions or stub portions 11 adapted to project and snugly fit within the tubular extremities 9 of the transversely arched portion of section 5 and removable pins or bolts 12 unite said sections detachably together. The rear extremities 13 of the tubular side members of frame section 10 are also bent downwardly at an angle to permit a detachable connection with a pair of posts 14 forming integral parts of rear axle 15 upon which wheels 3 are rotatably mounted. Pins 16, or any equivalent device, serve to fasten the posts 14 within the bent extremities 13 and by removing these pins the axle and rear wheels may be detached from frame section 10, and the posts 14 may then be inserted into the hollow extremities 9 of frame section 5, subsequently however to detachment of frame section 10 from section 5. When the rear axle is thus connected to section 5 the vehicle is shortened as appears in Fig. 4 to provide a velocipede which resembles very closely the ordinary velocipedes in common use and which have a seat 17 for the rider, handle bars 18 connected with the steering post and pedals 19 for front wheel 4 wherewith to propel the machine.

Frame section 10 comprises a wagon box 20 or a flat board may be used in lieu of a box, and inasmuch as the construction of the box or board may be variously modified without departing from the invention I have merely shown one form of box in dotted lines, see Fig. 2.

A convertible velocipede of the kind shown and described appeals to children because it can be readily converted from one type of a velocipede into an altogether different type, for purposes of play, but the vehicle has practical utility also in that it can be converted and used as a truck or express wagon when extended, the child riding and propelling the machine as in any ordinary velocipede.

What I claim is:

1. A velocipede frame having a front steering and propelling wheel and including a removable horizontal carrier section having detachable supporting wheels at its rear end, and means adapted to unite said wheels to said frame, when said horizontal carrier section is removed.

2. A combined velocipede and truck, comprising a steering and propelling wheel, an inclined riding frame, a horizontal riding body thereon provided with a pair of supporting wheels, means for detaching said horizontal body from said supporting wheels and from said inclined riding frame and means for detachably connecting said inclined riding frame to said supporting wheels.

3. A convertible velocipede, comprising a riding frame having a front steering and propelling wheel and angular extremities, a rear axle having wheels and supporting projections adapted to be affixed to said extremities, and a horizontal riding section having means at its opposite ends adapted to be affixed to said extremities and said projections when the rear axle is detached from said frame.

4. A combined velocipede and truck, comprising a steering and propelling wheel, an inclined riding frame, a horizontal riding body thereon provided with a pair of supporting wheels, means for detachably connecting said horizontal body at one end to said supporting wheels and at the other end to said inclined riding frame, said means also permitting a detachable connection to be made between said inclined riding frame and said supporting wheels.

Signed at Cleveland, in the county of Cuyahoga, and State of Ohio, this 14th day of December, 1920.

WILLIAM E. CLATWORTHY.